United States Patent
Muthuswamy et al.

(10) Patent No.: US 6,943,777 B2
(45) Date of Patent: Sep. 13, 2005

(54) ELECTRONIC DEVICE WITH USER INTERFACE CAPABILITY AND METHOD THEREFOR

(75) Inventors: Sivakumar Muthuswamy, Plantation, FL (US); Joseph G. Gillette, Margate, FL (US); Scott G. Potter, Coconut Creek, FL (US)

(73) Assignee: Motorola, Inc., Schaumburg, IL (US)

( * ) Notice: Subject to any disclaimer, the term of this patent is extended or adjusted under 35 U.S.C. 154(b) by 313 days.

(21) Appl. No.: 10/268,292

(22) Filed: Oct. 10, 2002

(65) Prior Publication Data
US 2004/0070569 A1 Apr. 15, 2004

(51) Int. Cl.[7] .............................................. G09G 5/00
(52) U.S. Cl. ..................... 345/168; 345/169; 345/173
(58) Field of Search ............................... 345/173–179, 345/156–157, 168–169; 178/18.1, 18.01; 341/20–23

(56) References Cited

U.S. PATENT DOCUMENTS

| 4,129,747 | A | | 12/1978 | Pepper, Jr. |
| 4,302,011 | A | | 11/1981 | Pepper, Jr. |
| 5,627,567 | A | * | 5/1997 | Davidson ..................... 345/173 |
| 5,729,221 | A | * | 3/1998 | Krolopp et al. ............... 341/22 |
| 6,593,914 | B1 | * | 7/2003 | Nuovo et al. ............... 345/169 |
| 2002/0027549 | A1 | * | 3/2002 | Hirshberg ..................... 345/168 |
| 2002/0149566 | A1 | * | 10/2002 | Sarkissian ..................... 345/168 |
| 2003/0011495 | A1 | * | 1/2003 | Trell ............................ 341/22 |
| 2003/0169188 | A1 | * | 9/2003 | Chang ......................... 341/22 |

* cited by examiner

Primary Examiner—Xiao Wu
(74) Attorney, Agent, or Firm—Randi L. Karpinia (57) ABSTRACT

An electronic device (11) includes a keypad (22) for data entry, a character recognition system (34), and a processor (28). The keypad (22) is comprised of one or more keys (24) and one or more interstitial spaces (26) located in close proximity to one or more associated keys of the one or more keys (24). The one or more interstitial spaces (26) and the one or more keys (24) are comprised of a plurality of touch sensitive material (46). The user input to the plurality of touch sensitive material (46) produces one or more activated segments (50) used by the character recognition system (34) to create a correlating character (60).

24 Claims, 10 Drawing Sheets

ELECTRONIC DEVICE WITH USER INTERFACE CAPABILITY AND METHOD THEREFOR

BACKGROUND OF THE INVENTION

1. Field of the Invention

The present invention relates in general to electronic devices. More particularly, the present invention relates to electronic devices with user interface capabilities.

2. Description of the Related Art

Electronic devices are increasingly providing services that rely on user input. These services include short messaging, electronic mail (e-mail), Internet web navigation, and the addition of local data such as phonebook entries or calendar appointments. The current trends in the industry of such added functionality coupled with size reduction provide conflicting requirements to device designers and manufacturers. For example, many of today's electronic devices' small size dictate a limited set of input keys and small, low-resolution displays. Such devices do not have enough space to provide adequate user input mechanisms to support the added functionality.

Today, some electronic devices such as mobile telephone handsets include a dual-state keypad in which each numbered key corresponds to a unique sequence of letters or symbols. Multitap input involves entering a particular letter by pushing the corresponding numbered key a certain number of times depending on what position the desired letter is in the sequence of that key. More efficient methods of data input utilize anticipated text entry methods in which the user enters a particular letter by simply pushing the corresponding key once, regardless of where the character lies in the sequence. As each character is added to a word, the system predicts the entire word based on a stored dictionary, letter sequence probability, or previous user patterns. If the predicted word is not the one that the user intended, the use of another key allows the user to scroll through other possible choices and select the desired word. Creating alphanumeric entries in this manner eliminates the need for an entire keyboard; however, it can be a tedious and timely process.

The introduction of the touchpad has improved the efficiency of user interfaces. Touchpads not only allow a user to move a cursor on a screen, they also can be used in combination with handwriting recognition technologies for text input. Typically, a user writes characters or symbols on the touchpad using their fingertips or a stylus pen. The device is able to recognize these characters or symbols and input them as text. A problem with the current use of touchpads is the requirement of a dedicated area on the electronic device for the user to enter characters or symbols or navigate a pointer continuously, thereby creating a need for extra space. Touchpads also often require the use of a stylus pen, causing the user to need both of their hands to input data.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
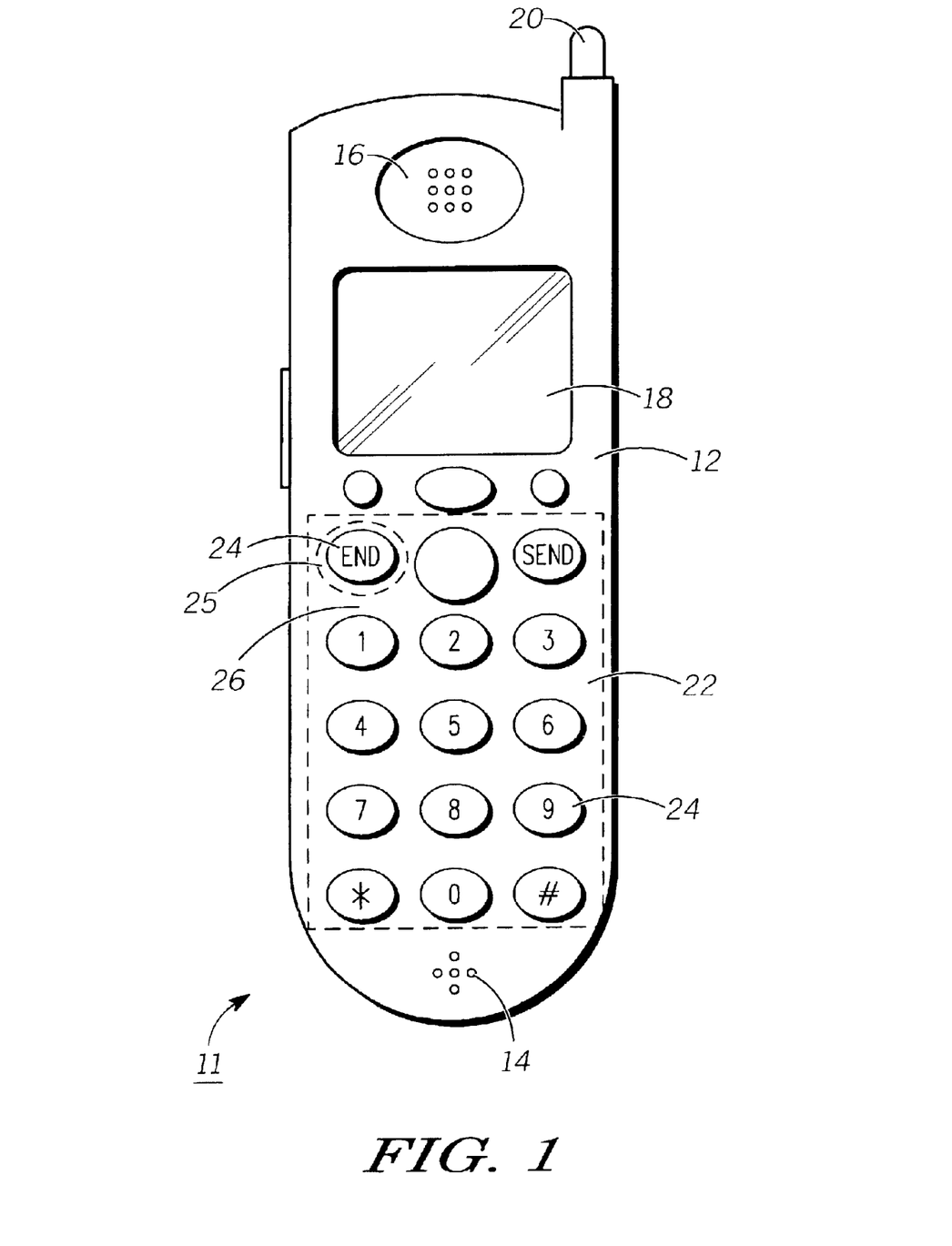
FIG. 1 illustrates an electronic device in accordance with the preferred embodiment of the present invention.

FIG. 1 is a front view of an electronic device 11 in accordance with a preferred embodiment of the present invention. Specifically, FIG. 1 illustrates a mobile telephone handset. Although the invention is illustrated herein with reference to a mobile telephone handset, the invention is alternatively applied to other electronic devices such as, for example, messaging devices, personal digital assistants, electronic translators, electronic dictionaries, videocassette recorders, electronic games, and the like. As illustrated, the electronic device 11 comprises a housing 12, a microphone 14, an earpiece 16, a display 18, an antenna 20, and a keypad 22. The microphone 14 converts an acoustic input signal received from a voice transmission to the electronic device 11 into an electric input signal. The earpiece 16 converts an electric output signal into an acoustic output signal transmitted from the electronic device 11 to be heard by the listener of the electronic device 11.

The display 18 displays data such as one or more communication messages, phone numbers, or caller identifications. The display 18 is used for displaying various information including a graphical indication of signal strength, telephones numbers that are dialed from the electronic device 11, or telephone numbers from which calls are received on the electronic device 11, names corresponding to entries in a digital memory based telephone book, and optionally information indicative of the state of the electronic device 11, e.g., battery charge, alert mode setting, and/or current position in the hierarchical menu. The display 18 can be, for example, a liquid crystal display. It will be appreciated by one of ordinary skill in the art that other similar displays can be utilized for the display 18.

The keypad 22 allows the user of the electronic device 11 to enter data such as phone numbers and text memos. The keypad 22 comprises one or more keys 24 which, for example, can be one or more momentary contact buttons, including a set of alphanumeric keys that are used to input alphanumeric data including telephone numbers, and other telephone book data (e.g., names). One or more of the set of alphanumeric keys can also have an associated secondary function that is invoked by pressing a special function key prior to pressing an alphanumeric key. It will be appreciated by those of ordinary skill in the art that alternatively the alphanumeric keys can be numeric keys in accordance with the present invention. The keypad 22 further comprises one or more interstitial spaces 26 located in close proximity to one or more associated keys of the one or more keys 24, and one or more gaps 25 located between one or more portions of the one or more interstitial spaces 26 and each associated key of the one or more keys 24.

Figure 2:
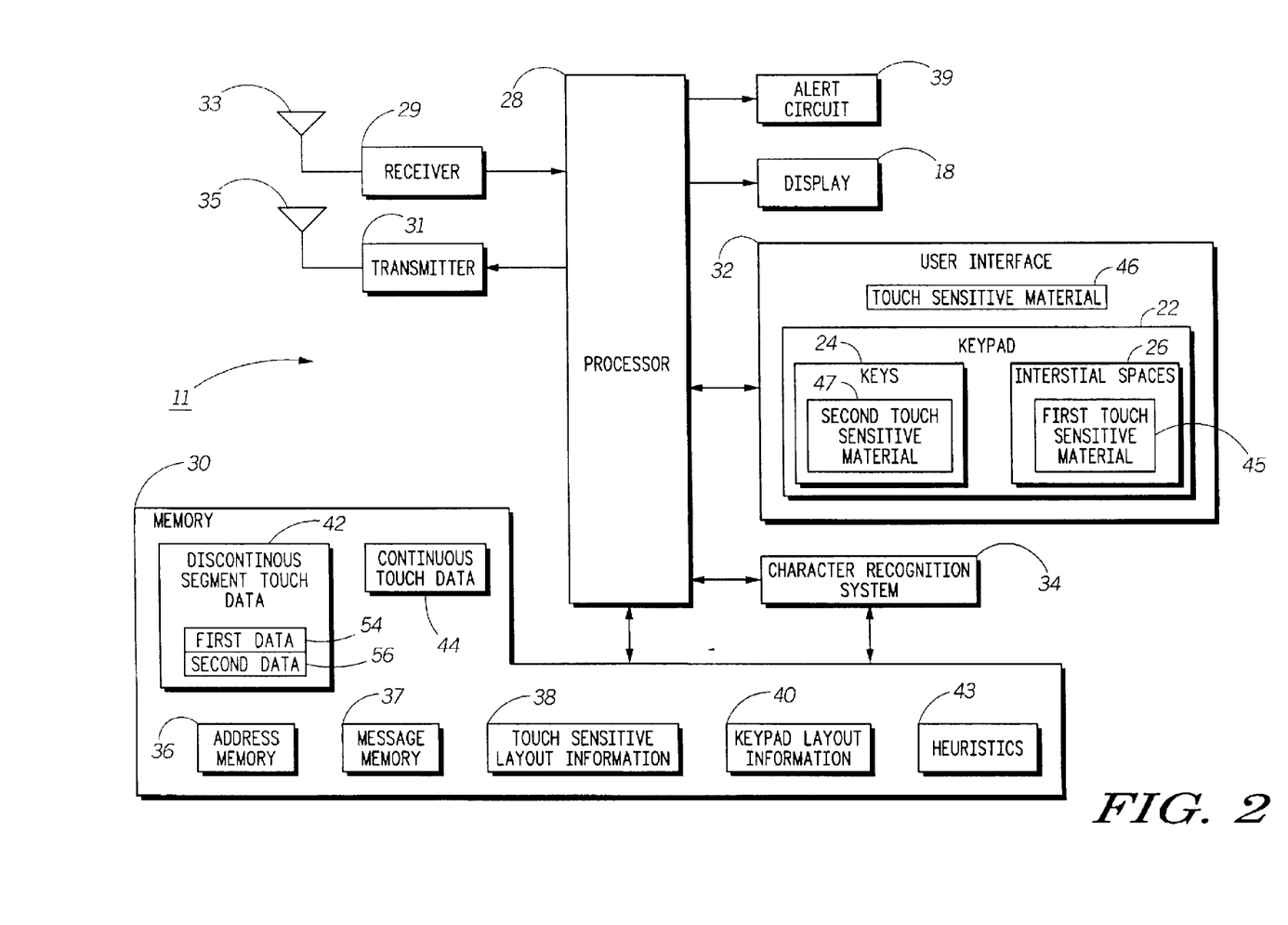
FIG. 2 illustrates an electronic block diagram of the electronic device of FIG. 1 for use in accordance with the preferred embodiment of the present invention.

FIG. 2 is an electronic block diagram of one embodiment of the electronic device 11, in accordance with the preferred embodiment of the present invention. As illustrated, the electronic device 11 preferably comprises a first antenna 33, a second antenna 35, a receiver 29, a transmitter 31, a processor 28, a memory 30, a user interface 32 (including any number of input means for information entry), and a character recognition system 34. It will be appreciated by those of ordinary skill in the art that the first antenna 33 and the second antenna 35 can alternatively be contained within the antenna 20 of FIG. 1.

The first antenna 33 intercepts transmitted signals from a wireless communication system. It will be appreciated by one of ordinary skill in the art that the wireless communication system, in accordance with the present invention, can function utilizing any wireless radio frequency (RF) channel, for example, a one or two-way messaging channel, a mobile cellular telephone channel, or a mobile radio channel. For example, the wireless communication system can be a cellular telephone system supported by standards such as Global System for Mobile Communications (GSM), Code Division Multiple Access (CDMA), Time Division Multiple Access (TDMA) or Universal Mobile Telecommunications System (UMTS). Similarly, it will be appreciated by one of ordinary skill in the art that the wireless communication system can function utilizing other types of communication channels such as infrared channels. In the following description, the term "wireless communication system" refers to any of the wireless communication systems mentioned above or an equivalent.

The first antenna 33 is coupled to the receiver 29, which employs conventional demodulation techniques for receiving the communication signals transmitted by a wireless communication system. Coupled to the receiver 29, is the processor 28 utilizing conventional signal-processing techniques for processing received messages. Preferably, the processor 28 is similar to the MC68328 micro-controller manufactured by Motorola, Inc. of Schaumburg, Ill. It will be appreciated by one of ordinary skill in the art that other similar processors can be utilized for the processor 28, and that additional processors of the same or alternative type can be utilized as required to handle the processing requirements of the processor 28. The processor 28 decodes an address in the demodulated data of the received message, compares the decoded address with one or more addresses stored in an address memory 36 of the memory 30; and when a match is detected, proceeds to process the remaining portion of the received message.

To perform the necessary functions of the electronic device 11, the processor 28 is coupled to the memory 30, which preferably includes a random access memory (RAM), a read-only memory (ROM), and an electrically erasable programmable read-only memory (EEPROM)(not shown). The memory 30 provides storage area for information including a continuous touch data 44, a discontinuous segment touch data 42, a touch sensitive layout information 38, a keypad layout information 40, and one or more heuristics 43, each of which will be discussed in further detail herein.

Once the processor 28 has processed a received message, it stores the decoded message in a message memory 37 of the memory 30. It will be appreciated by one of ordinary skill in the art that the message memory 37, in accordance with the present invention, can be a voicemail box or a group of memory locations in a data storage device. In the following description, the term "message memory" refers to any of the memory means mentioned above or an equivalent.

Upon receipt and processing of a message, the processor 28 preferably generates a command signal to an alert circuit 39 as a notification that the message has been received and stored. The alert circuit 39 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 39.

Upon receipt and processing of a message, the processor 28 preferably also generates a command signal to the display 18 to generate a visual notification of the receipt and storage of the message. When the display 18 receives the command signal from the processor 28 that the message has been received and stored in the message memory 37, a message indication is displayed. The message indication, for example can be the activation of one or more message icons on the display 18. The display 18 can be, for example, a liquid crystal display utilized to display text. It will be appreciated by one of ordinary skill in the art that other similar displays such as cathode ray tube displays can be utilized for the display 18.

The transmitter 31 is coupled to the processor 28 and is responsive to commands from the processor 28. When the transmitter 31 receives a command from the processor 28, the transmitter 31 sends a signal via the second antenna 35 to the wireless communication system.

In an alternative embodiment (not shown), the electronic device 11 includes one antenna performing the functionality of the first antenna 33 and the second antenna 35 such as the antenna 20 illustrated in FIG. 1. Further, the electronic device 11 alternatively includes a transceiver circuit performing the functionality of the receiver 29 and the transmitter 31. It will be appreciated by one of ordinary skill in the art that other similar electronic block diagrams of the same or alternate type can be utilized for the electronic device 11 to handle the requirements of the electronic device 11.

Preferably, the user interface 32 is coupled to the processor 28. The user interface 32 can be one or more buttons used to generate a button press, a series of button presses, a voice response from the device user, or some other similar method of manual response initiated by the user of the electronic device 11. In the present invention, the user interface 32 comprises a touch sensitive material 46. For example, at least one portion of the keypad 22 can comprise the touch-sensitive material 46. It will be appreciated by those of ordinary skill in the art that any other portion of the electronic device 11 such as a portion of the housing 12 (see FIG. 1) can comprise the touch sensitive material 46 in accordance with the present invention. Preferably, at least a portion of the one or more interstitial spaces 26 of the keypad 22 comprises a first portion of touch sensitive material 45. Similarly, at least a portion of the one or more keys 24 of the keypad 22 comprises a second portion of touch sensitive material 47. The processor 28, in response a user input to the user interface 32, such as a device user depressing a button or series of buttons and/or contacting the touch-sensitive material 46, initiates an input signal to the character recognition system 34. The character recognition system 34, in response to the user input signal to the user interface 32, accesses information in the memory 30 for use in operation of the character recognition system 34.

It will be appreciated that the character recognition system 34 can be hard coded or programmed into the electronic device 11 during manufacturing, can be programmed over-the-air upon customer subscription, or can be a downloadable application. It will be appreciated that other programming methods can be utilized for programming the character recognition system 34 into the electronic device 11. It will be further appreciated by one of ordinary skill in the art that the character recognition system 34 can be hardware circuitry within the electronic device 11. Preferably the character recognition system 34 automatically updates the display 18 when a new entry has been sent or received. For example, the display 18 can be updated continuously as one or more user inputs are received using the user interface 32. The character recognition system 34 uses the information stored in the memory 30 to perform functions relating to user inputs to the user interface 32. It will be appreciated by one of ordinary skill in the art that electronic devices having software-programming capabilities can include specialized and personalized display options and screens. Alternatively, electronic devices that do not include software-programming capabilities can include standard, pre-defined display options and screens.

Those of ordinary skill in the art will recognize that a user can provide input to the user interface 32 of the electronic device 11 by pressing one or more keys 24 to enter a specific digit or any letters corresponding with that key. In each of the preferred embodiments of the present invention, a user can additionally provide input to the user interface 32 of the electronic device 11 by sliding their finger over the keypad 22 which has the touch-sensitive material 46 disposed at various locations within it, depending on the specific embodiment. For example, a user can provide input to the user interface 32 of the electronic device 11 by sliding their finger over the first portion of touch sensitive material 45 disposed at various locations within the one or more interstitial spaces 26. Similarly, a user can provide input to the user interface 32 of the electronic device 11 by sliding their finger over the second portion of touch sensitive material 47 within the one or more keys 24. The use of the touch-sensitive material 46 including the first portion of touch sensitive material 45 and the second portion of touch sensitive material 47 is described in U.S. Pat. No. 4,129,747, entitled Human-Machine Interface Apparatus, issued Dec. 12, 1978 to Pepper, and in U.S. Pat. No. 4,302,011, entitled Video Game Apparatus and Method, issued Nov. 24, 1981 to Pepper, which are hereby fully incorporated by reference herein. In general, touch-sensitive material provides a human-machine interface consisting of a small, flat surface that you slide your finger over. Touch-sensitive material typically uses a principle called coupling capacitance, and requires a conductive pointer such as a finger. The touch-sensitive material 46 including the first portion of touch sensitive material 45 and the second portion of touch sensitive material 47, can, for example, contain a two-layer grid of electrodes, which are connected to an integrated circuit (IC) mounted under the touch-sensitive material. The upper layer contains vertical electrode strips while the lower layer is composed of horizontal electrode strips. The IC measures capacitance from each of the horizontal electrodes to each of the vertical electrodes. A finger near the intersection of two electrodes modifies the capacitance between them, since a finger has very different dielectric properties than air. The position of the finger is precisely determined based on these changes at various locations.

The use of the touch-sensitive material 46 including the first portion of touch sensitive material 45 and the second portion of touch sensitive material 47 can also be used to recognize characters or symbols written by a user as is well known in the art. Text recognition software allows users to trace the strokes of the specific character or symbol that they are trying to input. Handwriting recognition programs generally operate by comparing data generated from handwritten words or characters and stored recognition data (referred to as a dictionary by those skilled in the art) in an attempt to correctly recognize the handwritten words or characters as typewritten text.

Figure 3:
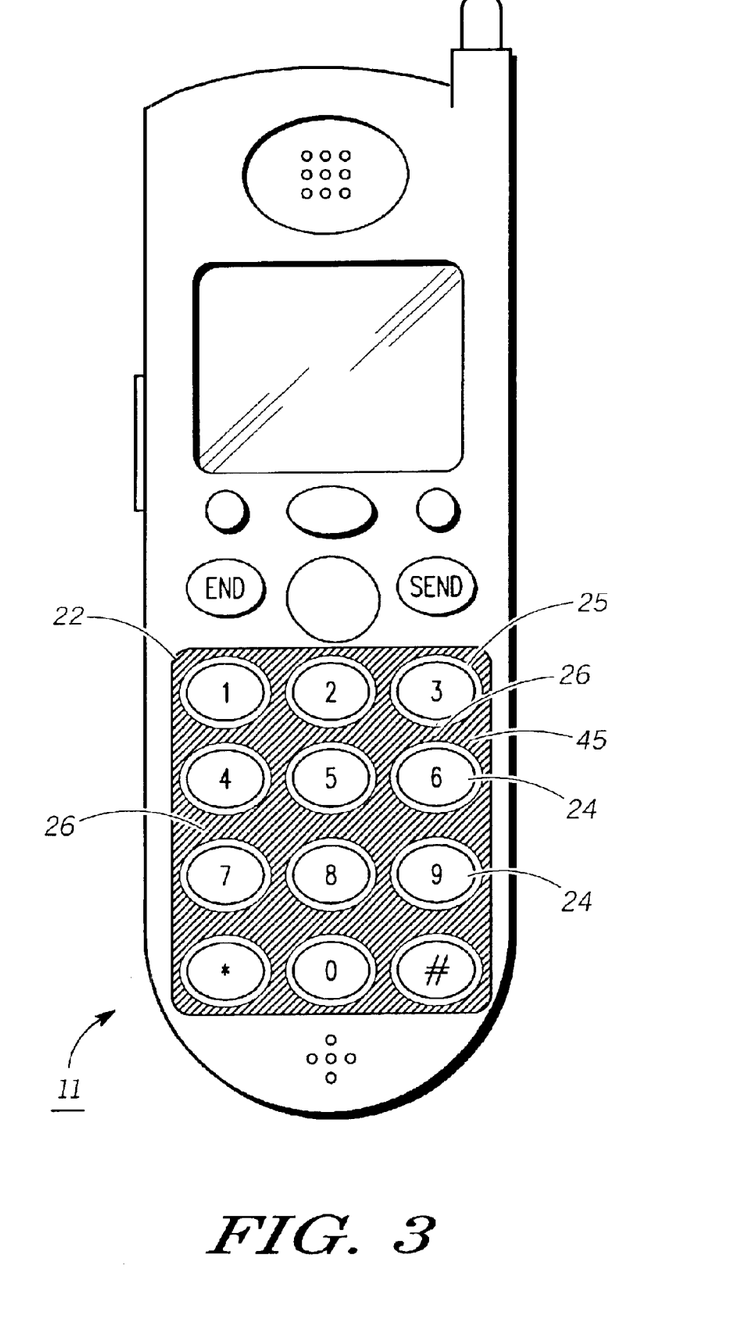
FIGS. 3 to 5 illustrate various embodiments of the present invention implemented within the electronic device of FIGS. 1 and 2.
Figure 4:
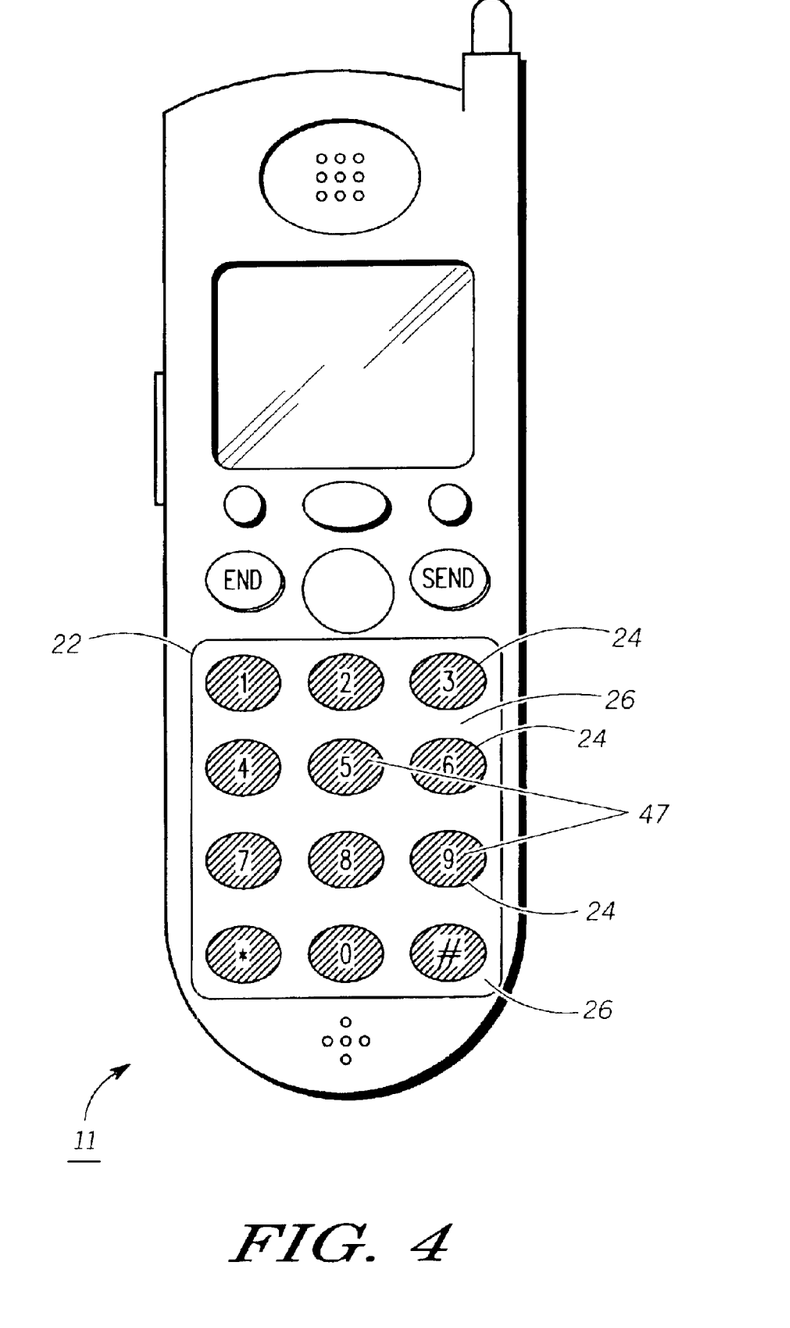
Figure 5:
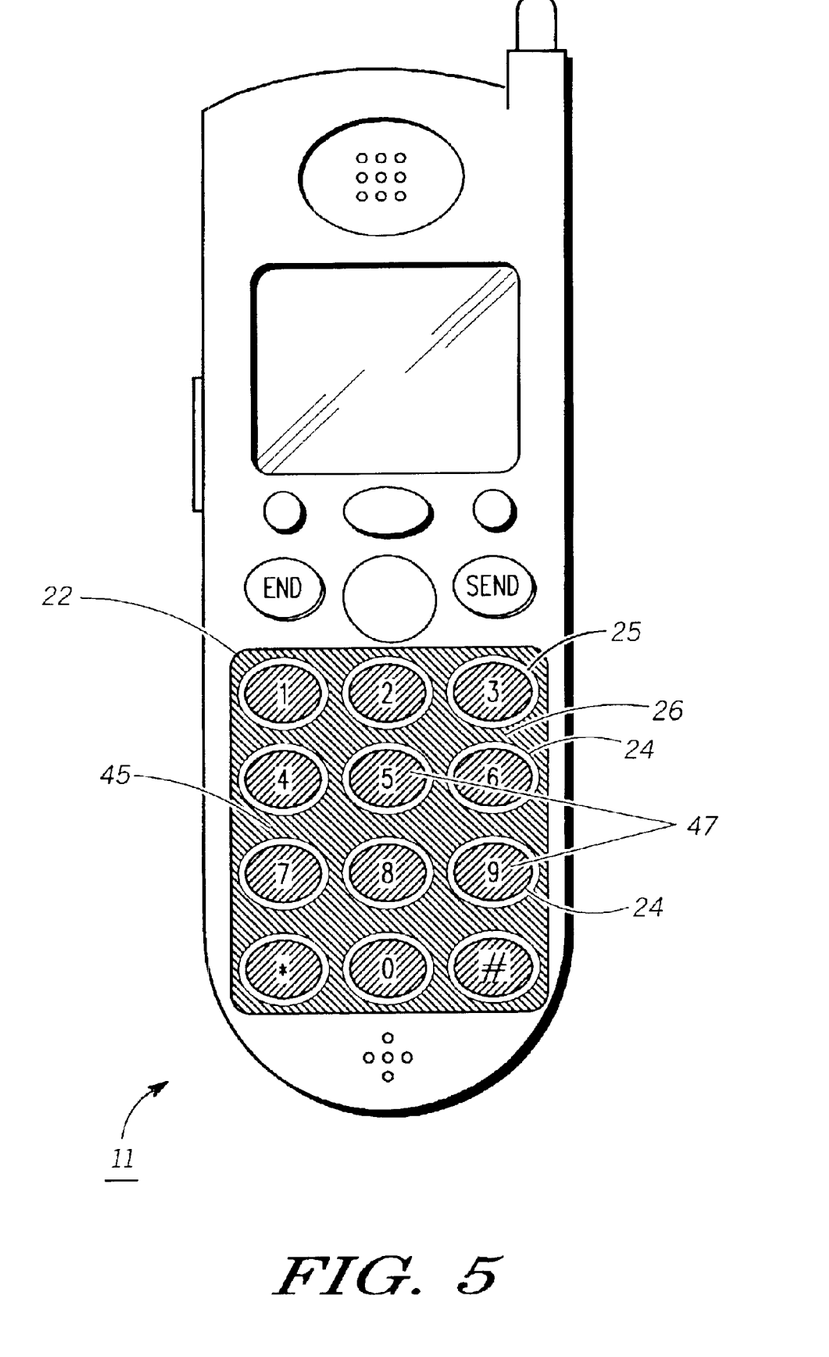

In accordance with the present invention, at least a portion of the one or more interstitial spaces 26 between each associated key of the one or more keys 24 can be comprised of the touch-sensitive material 46 including the first portion of touch sensitive material 45 as illustrated in FIG. 3 as the shaded areas. Similarly, and in accordance with the present invention, at least a portion of the one or more keys 24 can be comprised of the touch-sensitive material 46 including the second portion of touch sensitive material 47 as illustrated in FIG. 4 as the shaded areas. Alternatively, and in accordance with the present invention, the touch-sensitive material 46 can be disposed both within at least a portion of the one or more interstitial spaces 26 such as the second portion of touch sensitive material 47 and at least a portion of the one or more keys 24 such as the first portion of touch sensitive material 45 as illustrated in FIG. 5. It will be appreciated by those of ordinary skill in the art that various similar embodiments of the disposition of the touch-sensitive material 46 within the keypad 22 are within the scope of the present invention.

Figure 6:
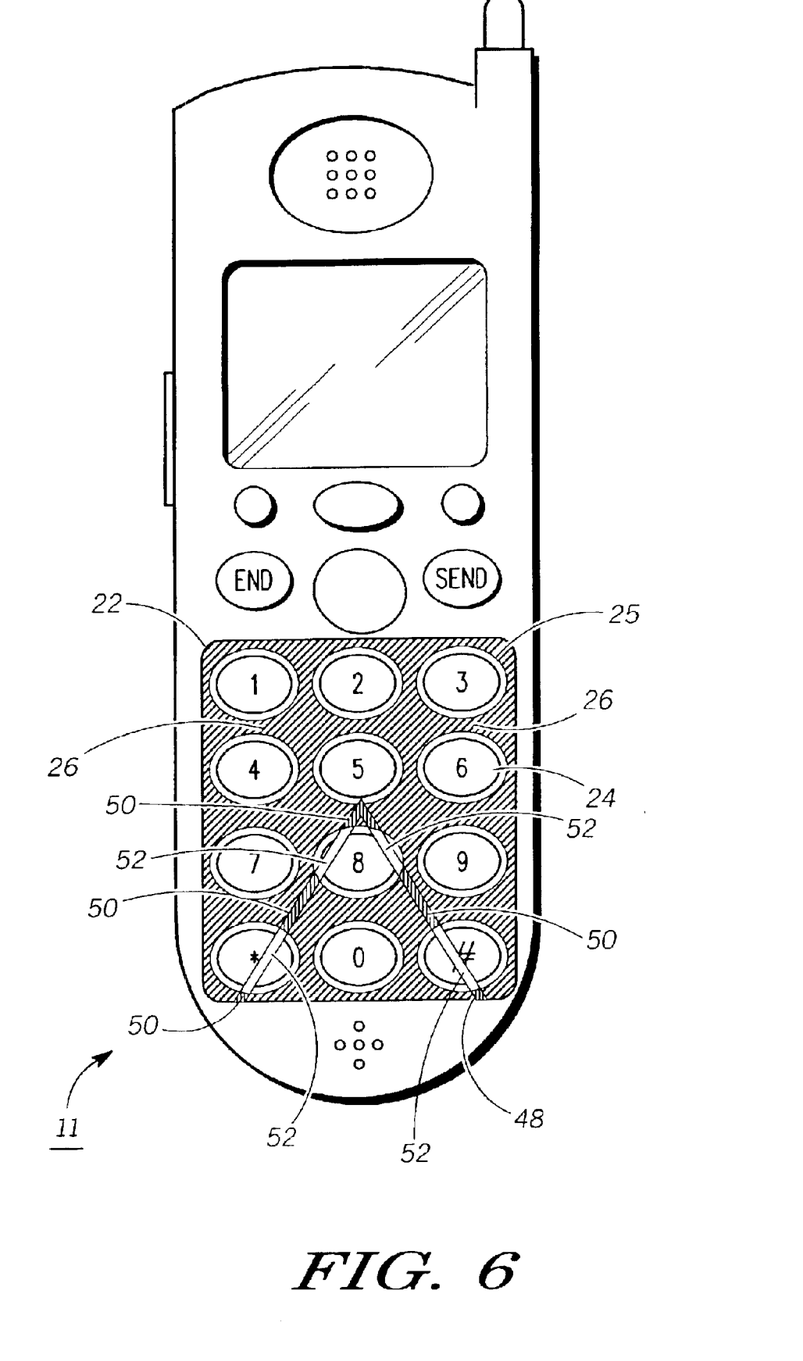
FIGS. 6 through 8 illustrate the use of the various embodiments of FIGS. 3 through 5 respectively to provide user inputs within the electronic device of FIGS. 1 and 2.
Figure 7:
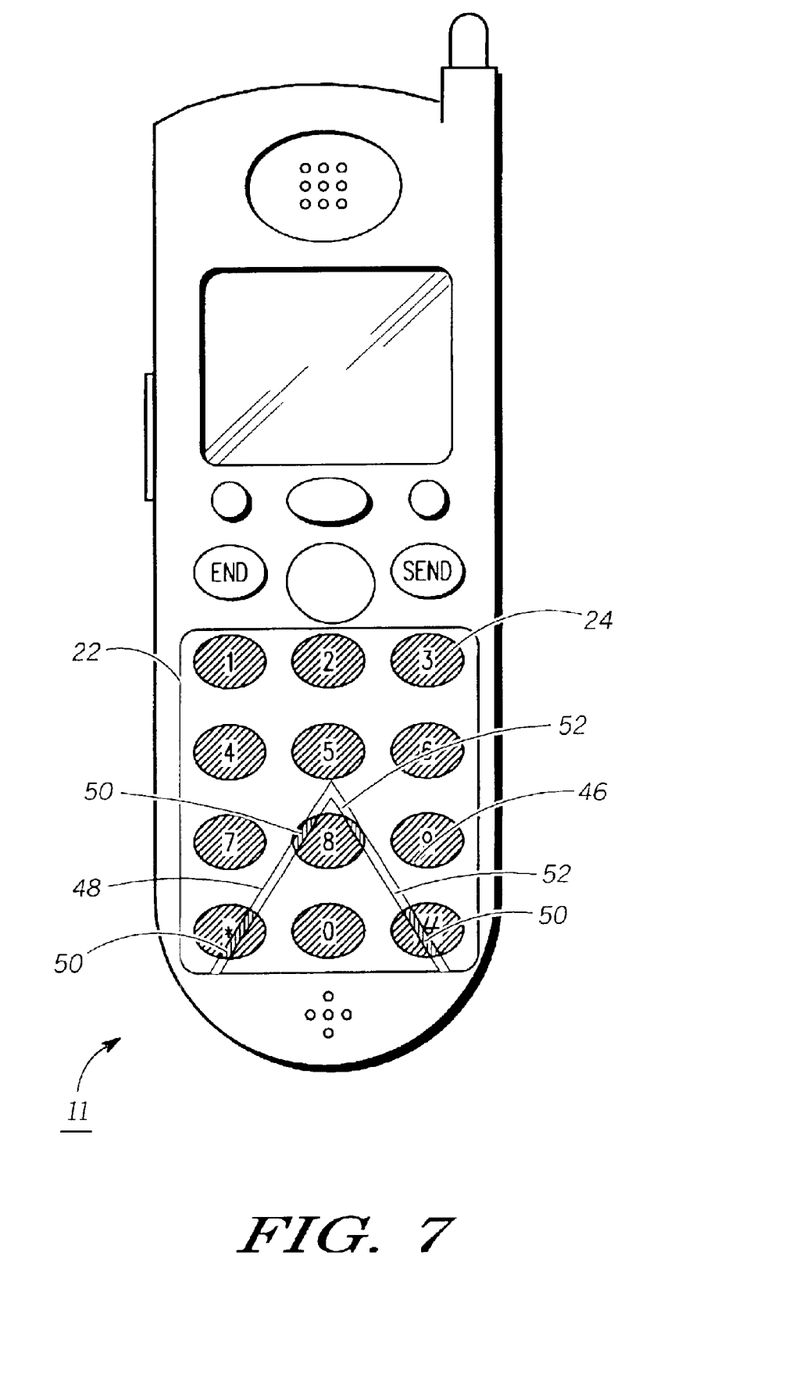
Figure 8:
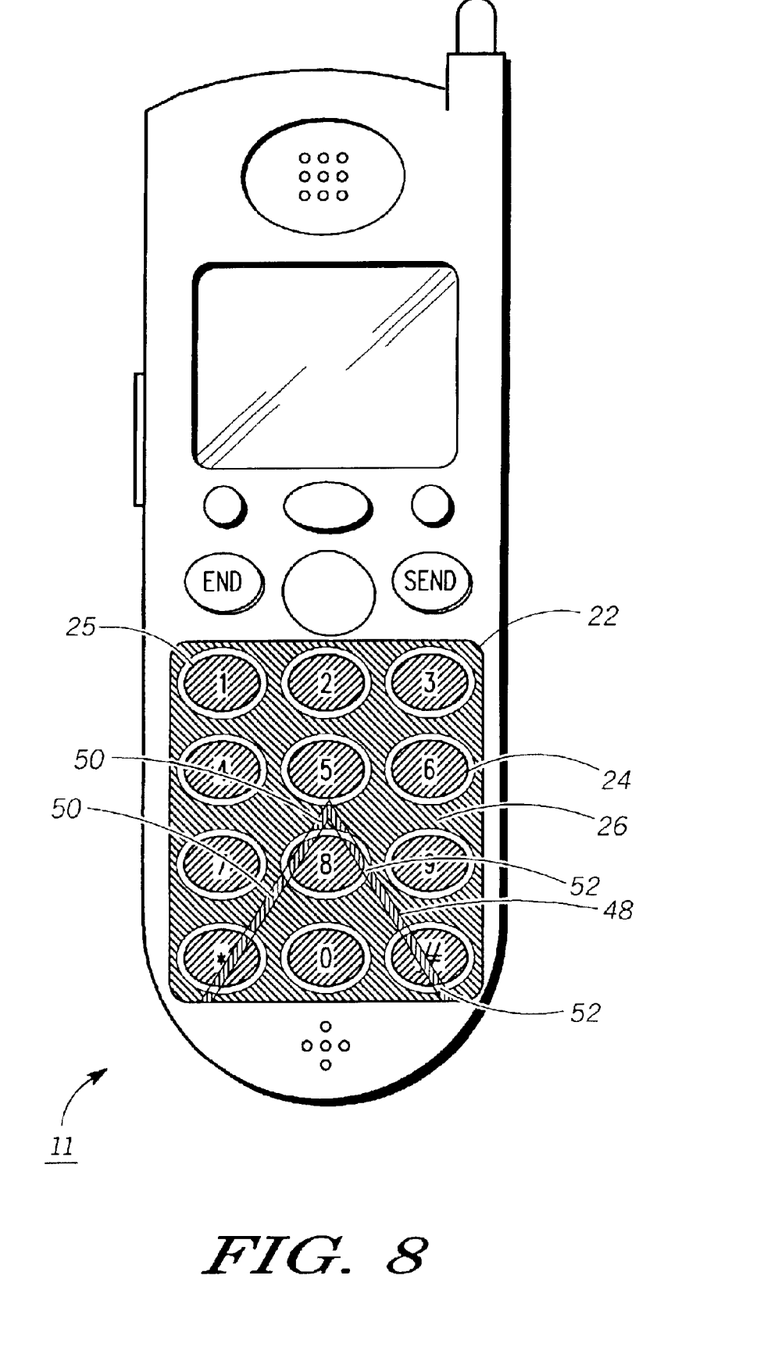

The touch-sensitive material 46 including the first portion of touch sensitive material 45 and the second portion of touch sensitive material 47 can be used for the input of character information into the electronic device 11 using any combination of the configurations illustrated in FIGS. 3 through 5. For example, FIGS. 6 through 8 illustrate the results of a user entering a character representation 48 of the letter "A" using the various embodiments of the present invention of FIGS. 3 through 5 respectively. In accordance with each of the preferred embodiments of the present invention, areas of the keypad 22 in which the touch-sensitive material 46 is disposed and that come into contact with a user's finger produces one or more activated segments 50. Those areas of the keypad 22 in which touch-sensitive material 46 is not disposed and that come into contact with a user's finger form one or more non-activated segments 52. For example, a user input to the one or more gaps 25 produces one or more non-activated segments 52.

Figure 9:
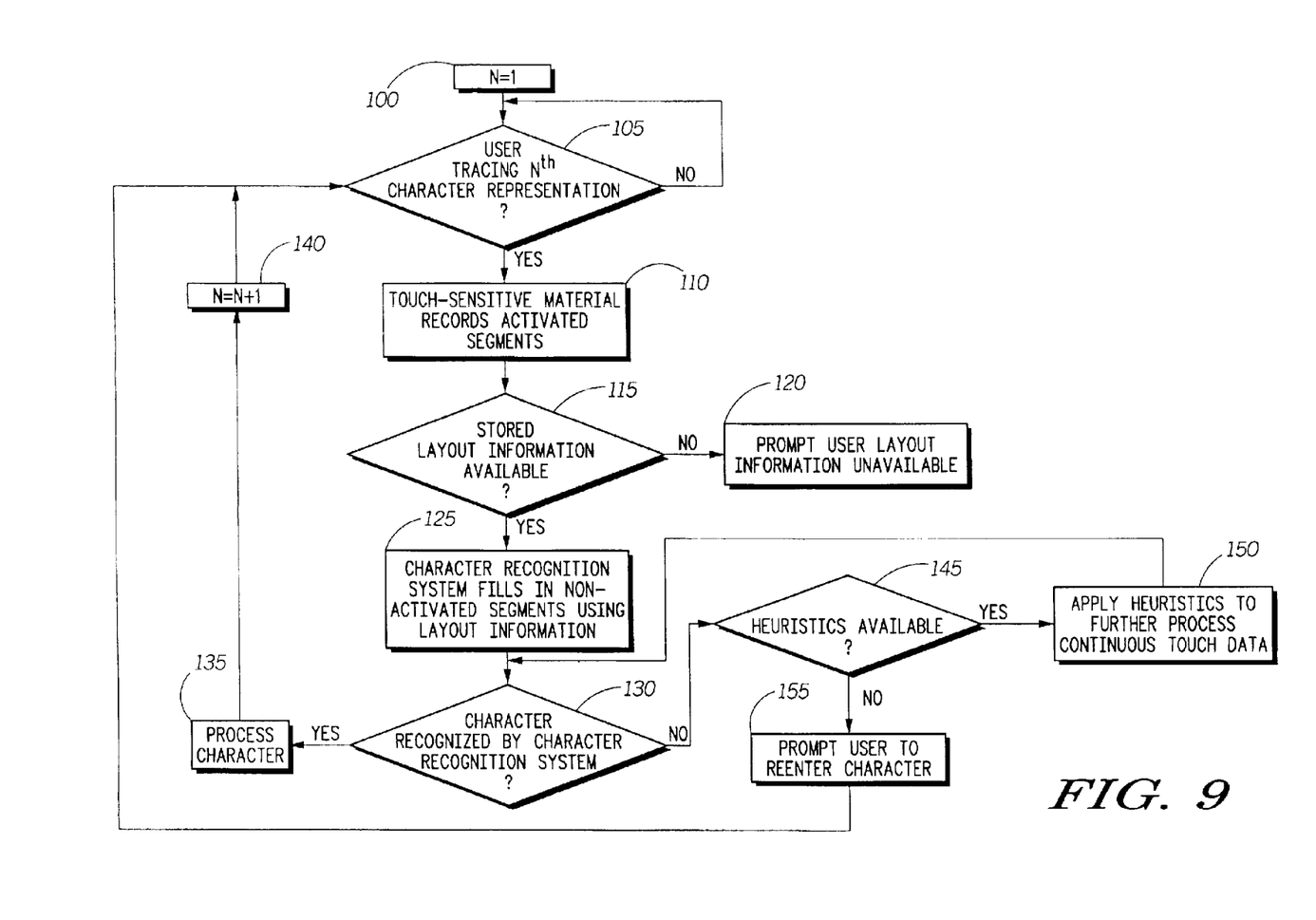
FIG. 9 illustrates a flowchart showing the how user-entered data is processed within the electronic device of FIGS. 1 and 2 in accordance with the preferred embodiment of the present invention.

Referring to FIG. 9, a flowchart is shown to demonstrate how a user input to the user interface 32, such as the strokes (i.e. sliding the finger over the touch sensitive material 46 including the first portion of touch sensitive material 45 and the second portion of touch sensitive material 47) representing the letter "A", is processed within the electronic device 11 in accordance with the present invention. In Step 100, a counter is set to the value one (1). In Step 105, the processor 28 periodically determines whether a user is tracing any character representation 48 onto one or more portions of the touch sensitive material 46 within the electronic device 11. When the user writing one or more strokes on the touch sensitive material 46 is detected, in Step 110 all traces of the one or more strokes that are over the touch-sensitive material 46 such as the first portion of touch sensitive material 45 within at least a portion of the one or more interstitial space 26 and the second portion of touch sensitive material 47 within at least a portion of the one or more keys 24 are recorded as one or more discrete activated segments 50 creating the discontinuous segment touch data 42. The discontinuous segment touch data 42, for example, can include a first discontinuous touch data 54 representing the one or more traces over the first portion of touch sensitive material 45 and a second discontinuous touch data 56 representing the one or more traces over the second portion of touch sensitive material 47. This discontinuous segment touch data 42 is sent to the processor 28 and then stored in the memory 30. In Step 115, the processor 28 determines whether the keypad layout information 40 and the touch-sensitive layout information 38 are stored in memory 30. The keypad layout information 40, for example, can comprise the location and shape of each of the one or more keys 24 and the location and shape of the one or more interstitial spaces 26 between each of the one or more keys 24. The touch-sensitive layout information 38, for example, can comprise the location and shape of the touch-sensitive material 46 disposed on or within the electronic device 11. For example, the touch sensitive layout information 38 can include the location and shape of the first portion of touch sensitive material 45 within the one or more interstitial spaces 26 and the location and shape of the second portion of touch sensitive material 47 within the one or more keys 24. In Step 120, when either the keypad layout information 40 or the touch-sensitive layout information 38 is not stored in the memory 30, the user is notified by a prompt on the display 18. When the keypad layout information 40 and the touch-sensitive layout information 38 is stored in the memory 30, in Step 125 the character recognition system 34 receives the discontinuous segment touch data 42 from the processor 28 and uses the keypad layout information 40 and the touch-sensitive layout information 38 to fill in any non-activated segments 50, thus creating the continuous touch data 44 which is then stored in the memory 30. Next, in Step 130, the continuous touch data 44 is sent to the character recognition system 34, which attempts to identify a correlating character 60 from the continuous touch data 44. When a correlating character 60 (i.e. see FIG. 10) is recognized by the character recognition system 34, in Step 135 the correlating character 60 is processed. The step of processing includes sending the correlating character 60 to the display 18 for visual display of the correlating character 60 as well as back to the application that was in the current context.

Figure 10:
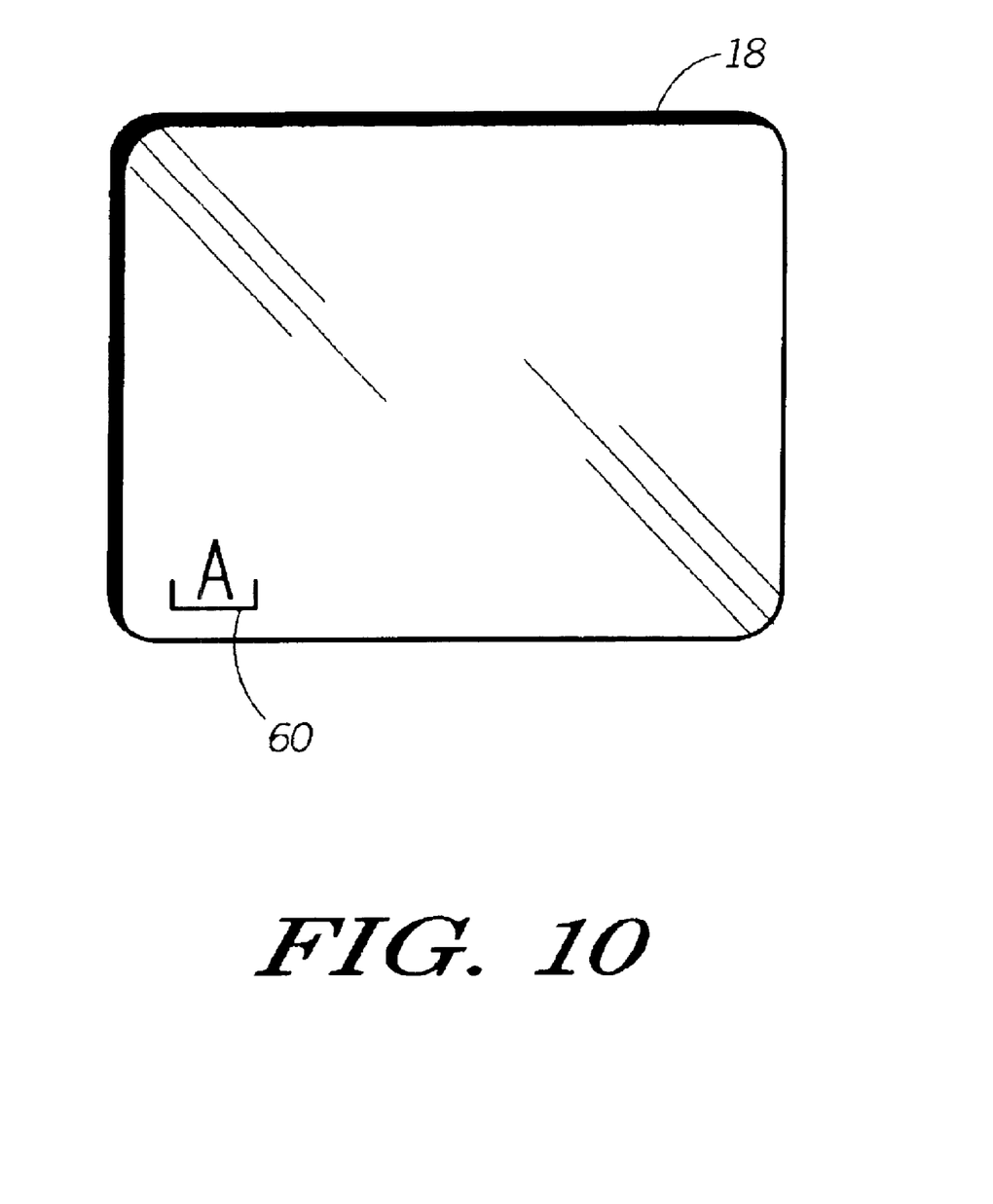
FIG. 10 illustrates one example of user-entered data on the screen of the electronic device of FIGS. 1 and 2 in accordance with the preferred embodiment of the present invention.

Referring to FIG. 10, the character "A" has been recognized as the correlating character 60 in the present example and the now appears on the display 18 of the electronic device 11. In one embodiment, the correlating character 60 can further be sent to one or more applications within the electronic device for further utilization and/or processing. For example, when a user enters this character "A" while editing a memo, the correlating character 60 can also be sent by the processor 28 back to the memo application.

Referring back to FIG. 9, in Step 140, the counter is incremented allowing for entry of the next character. Referring back to Step 130, when a correlating character 60 cannot be recognized from its continuous touch data 42, then in Step 145 the processor 28 determines if one or more heuristics 43 are available in the memory 30. It is well known in the art that character recognition systems can use heuristics to improve recognition accuracy. The one or more heuristics 43 can provide character error correction such as correction of the speed at which a character is entered, the orientation at which a character is entered, any distortion of the character caused by the user during entry, or the like. When the one or more heuristics 43 are available in the present example, in Step 150 the one or more heuristics 43 can be applied to the continuous touch data 44 and in Step 130 the character recognition system 34 can reattempt to recognize the correlating character 60. When no additional heuristics are available at Step 145, the user is prompted to reenter another character as shown in Step 155.

While a detailed description of the preferred embodiment of the invention has been given, it should be appreciated this invention can be realized in a number of embodiments, of which the disclosed embodiment is only one alternative, without departing from the scope of the invention as set forth in the appended claims. For example, touch-sensitive material can be disposed in other interstitial areas of the electronic device, such as on its side or back. Additionally, the present invention can also be used for forms of user input other than character entry, such as pointer navigation or menu scrolling. Accordingly, it is intended that all such alterations and modifications be considered as within the spirit and scope of the invention as defined by the appended claims.

What is claimed is:

1. An electronic device comprising:
   a user interface for information entry, wherein the user interface comprises:
   a keypad for data entry, wherein the keypad comprises:
      one or more keys, and
      one or more interstitial spaces located in close proximity to one or more associated keys of the one or more keys, wherein the one or more interstitial spaces is comprised of a first portion of touch sensitive material;
   a character recognition system; and
   a processor coupled between the user interface and the character recognition system, wherein the processor is programmed to initiate an input signal to the character recognition system in response to the user input to the first portion of touch sensitive material.

2. An electronic device as recited in claim 1, wherein the user input comprises a user sliding one or more fingers over the first portion of touch sensitive material of the one or more interstitial spaces.

3. An electronic device as recited in claim 2 wherein the user input to the first portion of touch sensitive material generates one or more activated segments.

4. An electronic device as recited in claim 3 wherein the keypad further comprises:
   one or more gaps located between one or more portions of the one or more interstitial spaces and each associated key of the one or more keys, wherein the user input further comprises the user sliding one or more fingers over the one or more gaps, thereby generating one or more non-activated segments.

5. An electronic device as recited in claim 1, further comprising:
   a memory coupled to the processor and further coupled to the character recognition system for providing storage area for an information, wherein the information is selected from a group consisting of a continuous touch data, a discontinuous segment touch data, a touch sensitive layout information, a keypad layout information, and a heuristics,
   wherein the character recognition system accesses the information in the memory in response to the input signal from the processor.

6. An electronic device as recited in claim 1 further comprising:
   a display coupled to the processor and further coupled to the character recognition system, wherein the character recognition system updates the display in response to receiving the input signal from the processor.

7. An electronic device as recited in claim 1, wherein each of the one or more keys is comprised of a second portion of touch sensitive material, and wherein the processor is further programmed to initiate the input signal to the character recognition system in response to the user input to the second portion of touch sensitive material.

8. An electronic device as recited in claim 7, wherein the user input comprises a user sliding one or more fingers over the second portion of touch sensitive material of the one or more keys.

9. An electronic device as recited in claim 8 wherein the user input to the second portion of touch sensitive material generates one or more activated segments.

10. An electronic device comprising:
    a user interface for information entry, wherein the user interface comprises:
        a keypad for data entry, wherein the keypad comprises:
            one or more keys, wherein each of the one or more key is comprised of a a first portion of touch sensitive material,
            one or more interstitial spaces located in close proximity to one or more associated keys of the one or more keys, wherein the one or more interstitial spaces is comprised of a second portion of touch sensitive material, and
            one or more gaps located between one or more portions of the one or more interstitial spaces and each associated key of the one or more keys;
    a character recognition system; and
    a processor coupled between the user interface and the character recognition system, wherein the processor is programmed to initiate an input signal to the character recognition system in response to a user input,
    wherein the user input comprises:
        a user sliding one or more fingers at least one portion of touch sensitive material, thereby generating one or more activated segments, and
        the user sliding one or more fingers over the one or more gaps, thereby generating one or more non-activated segments.

11. A method within an electronic device for user input comprising:
    detecting a user writing one or more strokes on a keypad, wherein the keypad comprises one or more interstitial spaces, and further wherein the one or more interstitial spaces comprises a first portion of touch sensitive material;
    recording one or more traces of the one or more strokes over the first portion of touch sensitive material as one or more discrete activated segments creating a first discontinuous segment touch data; and
    identifying a correlating character from the first discontinuous segment touch data.

12. The method as recited in claim 11 further comprising prior to the identifying step:
    storing a discontinuous segment touch data including the first discontinuous segment touch data in a memory; and
    creating a continuous touch data using the discontinuous segment touch data by filling in one or more non-activated segments using a keypad layout information stored in memory,
    wherein the identifying step includes utilizing the continuous touch data to identify the correlating character.

13. A method as recited in claim 12 wherein the keypad further comprises one or more keys, and further wherein at least a portion of the one or more keys comprises a second portion of touch sensitive material, the method further comprising:
    recording one or more traces of the one or more strokes over the second portion of touch sensitive material as one or more discrete activated segments creating a second discontinuous segment touch data;
    storing the second discontinuous segment touch data within the discontinuous touch data stored in the memory.

14. A method as recited in claim 13 wherein the keypad further comprises one or more gaps located between one or more portions of the one or more interstitial spaces and each associated key of the one or more keys, the method further comprising:
    recording one or more traces of the one or more strokes over the one or more gaps as the one or more non-activated segments; and
    storing the one or more non-activated segments in the memory.

15. A method as recited in claim 12 wherein the keypad layout information comprises a location and shape of the one or more interstitial spaces.

16. A method as recited in claim 12 wherein the creating step further comprises using a touch sensitive layout information stored in memory to create the continuous touch data.

17. A method as recited in claim 16 wherein the touch sensitive layout information comprises a location and shape of the first portion of touch sensitive material disposed within the one or more interstitial spaces.

18. A method as recited in claim 13 wherein the keypad layout information comprises a location and shape of each of the one or more keys.

19. A method as recited in claim 13 wherein the creating step further comprises using a touch sensitive layout information stored in memory to create the continuous touch data.

20. A method as recited in claim 19 wherein the touch sensitive layout information comprises a location and shape of the second portion of touch sensitive material disposed within the one or more keys.

21. A method as recited in claim 12 further comprising:
    displaying the correlating character on a display.

22. A method as recited in claim 21 further comprising:
    repeating the detecting, recording, storing, creating, and identifying steps for a plurality of characters.

23. A method as recited in claim 12 wherein the identifying step further comprises applying one or more heuristics to the continuous touch data to identify the correlating character.

24. A method as recited in claim 23 wherein the one or more heuristics provide character error correction, wherein the character error is selected from a group consisting of a speed at which a character is entered, an orientation at which a character is entered, and a distortion of a character caused by the user during entry.

* * * * *